United States Patent [19]

Meuser et al.

[11] Patent Number: 4,925,532

[45] Date of Patent: May 15, 1990

[54] APPARATUS FOR THERMAL CONVERSION OF ORGANIC MATTER

[75] Inventors: William E. Meuser, Springdale; Gary W. LaRue, Siloam Springs, both of Ark.; Windel L. Harris, Neosho, Mo.; James A. Donahue, Huntsville, Ark.; L. H. Bonney, Strongsville, Ohio; Gene W. Glanton, Houston, Tex.

[73] Assignee: PTO, Inc., Springdale, Ark.

[21] Appl. No.: 342,056

[22] Filed: Apr. 24, 1989

[51] Int. Cl.$^5$ .......................... C10B 1/06; C10B 49/14
[52] U.S. Cl. ...................................... 202/219; 48/92; 202/108; 202/266
[58] Field of Search .................. 202/99, 107, 108, 117, 202/219, 266; 48/92, 111; 196/14.52, 118; 422/233, 268; 198/465.1, 465.3; 201/11

[56] References Cited

U.S. PATENT DOCUMENTS 3,977,960  8/1976  Stout .................................... 202/219
4,690,732  9/1987  Everman et al. .................... 202/108

FOREIGN PATENT DOCUMENTS 115158  5/1942  Australia ............................. 202/219

Primary Examiner—Joye L. Woodard
Attorney, Agent, or Firm—Richard C. Litman

[57] ABSTRACT

A method and apparatus for the thermal conversion of organic waste materials includes a tank having a molten metal bath, preferably lead, through which apertured containers are transported by primary conveyer members in a plane intermediate two arrays of heating devices. Buoyancy of the waste-filled containers is resisted by abutment members within the tank while alignment elements on the containers prevent the containers from becoming askew during their travel through the tank. The abutment members may comprise fixed rails or secondary coveyor members spaced atop the primary conveyor members. Agitation devices within the tank assist in maintaining maximum heat distribution throughout the bath. Produced hydrocarbons are collected by a main hood overlying the major portion of the tank bath surface while separate shroud assemblies overlie other, individual isolated bath surfaces at the entrance and exit of the tank. Inorganic and/or products not converted by the elevated temperature of the bath (over 650 degrees F.), accumulate on the surface and are periodically removed by a skimmer apparatus, communicating with the exterior of the hood. A continuous process is achieved by utilizing conveyors to deliver and retrieve the containers to and from the tank, respectively.

13 Claims, 3 Drawing Sheets

APPARATUS FOR THERMAL CONVERSION OF ORGANIC MATTER

FIELD OF THE INVENTION

This invention relates generally to means for the efficient disposal of solid organic waste matter and more particularly, to an improved continuous batch method and apparatus for the thermal conversion of organic matter into gaseous and vapor forms which may be further treated to yield hydrocarbon liquids exhibiting various boiling points.

BACKGROUND OF THE INVENTION

The need for efficient means for the considerate disposal of waste products has long been addressed. Landfills have been utilized as the least expensive manner for disposal since it requires no more than the collection and transport of the material to the site. This procedure has been followed in many areas which still have sufficient open areas available. However, several factors preclude the employment of landfills. Less and less space now exists in many countries, particularly in and adjacent to urban areas, which areas obviously generate the greatest volume of waste material. Additionally, ever increasing environmental controls are forcing many jurisdictions to seek alternate means for waste disposal.

In the case of inorganic matter, it is known to recycle many materials such as glass and metals and the processes for handling these offer little environmental concern. On the other hand, the disposal of waste organic matter has been known to raise many objections. In a landfill, many waste organic materials may discompose and yield harmful products capable of contaminating the soil and ground water. Other organic wastes, such as vehicle tires and the myriad of plastics products, exhibit little or no decomposition in a landfill and more importantly, are difficult to bury. These latter wastes, in view of their resiliency, tend to work their way to the surface of any manipulated landfill. Many dumps devoted exclusively to tires are located throughout the country—some containing several million tires each. When these have caught on fire, it has often taken several weeks to extinguish the smoldering blaze with a most objectionable emission usually spreading over tens of thousands of acres.

Several states and other jurisdictions have totally outlawed any further landfills. This action dictates that new means must be provided to accommodate the disposal of at least those organic materials which heretofore mostly have been relegated to a landfill or the like. With over 200 million tires being used annually in this country alone, it follows that any disposal method which can utilize tires as an infeed and which yields valuable by-products, will present a unique advancement of the art.

DESCRIPTION OF THE RELATED ART

The broad concept of using molten metal, including lead, for the thermal conversion of organic matter is generally known. U.S. Pat. No. 1,709,370 dated Apr. 16, 1928 shows the distillation of crushed coal by depositing the coal upon the surface of molten lead and dragging it across the surface. The shortcomings of heating organic matter atop a molten bath was recognized in U.S. Pat. No. 1,601,777 issued Oct. 5, 1926 and wherein crushed shale is moved along the undersurface of a slightly inclined apertured member, beneath the surface of a heated bath. A still further improvement will be found in U.S. Pat. No. 2,459,550 dated Jan. 18, 1949 wherein granular wood or coal is distilled by passing it through a molten metal bath, sandwiched between two endless screens. The above examples all relate to the distillation of particulate or granular material. None of the prior art of which applicants are aware suggests the present invention wherein any combination of organic waste material, of varying configurations, may be simultaneously converted, in a continuous batch process with an extremely high degree of efficiency, both as to speed of processing as well as to the value of the collected hydrocarbons.

SUMMARY OF THE INVENTION

By the present invention, an improved method and apparatus for the thermal conversion of organic matter is provided. Infeed organic material is conveyed through a heated bath of suitable liquid, the selected composition of which serves to present a temperature of over 650 degrees F. Lead is a preferred material for the tank liquid, in view of its high boiling temperature. However, due to the high specific gravity of lead, the importance of positive containment means for the products being transported, cannot be overlooked. Accordingly, a conveyor arrangement is used which not only permits control of the dwell time of the waste material within the tank containing the heated liquid but also insures that the waste material remains fully submerged during the primary phase of its travel through the tank. Such a conveyor system should include a horizontal, supporting conveyor run suitably cooperating with a plurality of separate, individual waste-containing baskets or devices with appropriate means such that the waste containers are captively retained at a fixed level during its passage through the majority of the tank. Preferably, the waste material is more positively retained, by means of a plurality of foraminous, perforated or otherwise apertured containers carried by the conveyor. To facilitate the expedient loading of waste products into the heated tank bath, the containers may include pivotal top covers, automatically closed prior to each container being directed into the bath. To prevent lateral shifting of the containers during their transport through the bath, as well as opening of the covers due to buoyancy of the confined waste material, cooperating alignment and guide means are provided. Preferably, endless conveyor members are employed to carry the containers through the molten metal bath. The containers may be supplied to the entrance of the tank and subsequently removed from the exit end thereof by suitable conveyor apparatus or alternatively, the containers may be affixed to the tank conveyor members and remain secured thereto, during the return run of the conveyor members, externally of the tank. Likewise, the retention means for precluding floating of the containers within the higher density molten metal, may comprise fixed rails or the like within the tank and above the containers or, an additional endless conveyor apparatus operating at an elevation above the plane of the traveling containers.

To maximize the even heat distribution throughout the bath and thus enhance the decomposition of the organic waste material, agitation means are proposed for the individual containers and/or conveyor members passing through the tank. Such agitation is paramount to insure the most efficient process particularly when employing lead as the heat conveying vehicle. Although lead is an excellent heat conductor, such conduction, in a tank with a transversely moving mass, occurs primarily in a vertical direction as the principal heating source is applied from beneath the moving containers. Thus, the heat consumed in converting the organic waste into hydrocarbon gases and vapors must be rapidly replaced if the system is to operate continuously and at its greatest efficiency.

Accordingly, one of the objects of the present invention is to provide an improved method and apparatus for thermal conversion of organic matter.

Another object of the present invention is to provide an improved thermal conversion apparatus including a continuous batch transport system for transporting waste material through a heated bath.

A further object of the present invention is to provide an improved thermal conversion apparatus including a heated liquid bath with apertured waste-retaining containers carried by a conveyor and stationary retention members within the bath preventing flotation of the containers.

A further object of the present invention is to provide an improved thermal conversion apparatus including dual, vertically spaced apart endless conveyor devices captively transporting therebetween apertured receptacles containing organic waste material, through a bath of molten metal.

Still another object of the present invention is to provide an improved thermal conversion apparatus including a tank containing molten lead with apertured trash-containing baskets conveyed therethrough and provided with agitating elements to encourage an even distribution of heat within the lead.

Another object of the present invention is to provide an improved thermal conversion apparatus including a molten metal bath through which apertured waste-containing baskets are conveyed with the surface of the bath shrouded to collect all off-take gases and a skimmer device acting upon the bath surface to remove material not vaporized by the molten metal.

A further object of the present invention is to provide an improved thermal conversion apparatus including a molten metal bath through which apertured waste-containing baskets attached to endless conveyor members are transported sequentially, through the bath and externally thereof, in a continuous manner.

A further object of the present invention is to provide an improved thermal conversion apparatus including the transport of captively retained waste material in individual containers through a bath of molten lead with devices to maintain the containers below the surface of the lead and an oxygen-free offtake system directing the produced gases to fractionating means for separating out various hydrocarbon products.

With these and other objects in view which will more readily appear as the nature of the invention is better understood, the invention consists in the novel combination and assembly of parts hereinafter more fully described, illustrated and claimed with reference being made to the attached drawings.

BRIEF DESCRIPTION OF THE DRAWINGS

Similar reference characters designate corresponding parts throughout the several figures of the drawings.

DESCRIPTION OF THE PREFERED EMBODIMENT

Figure 1:
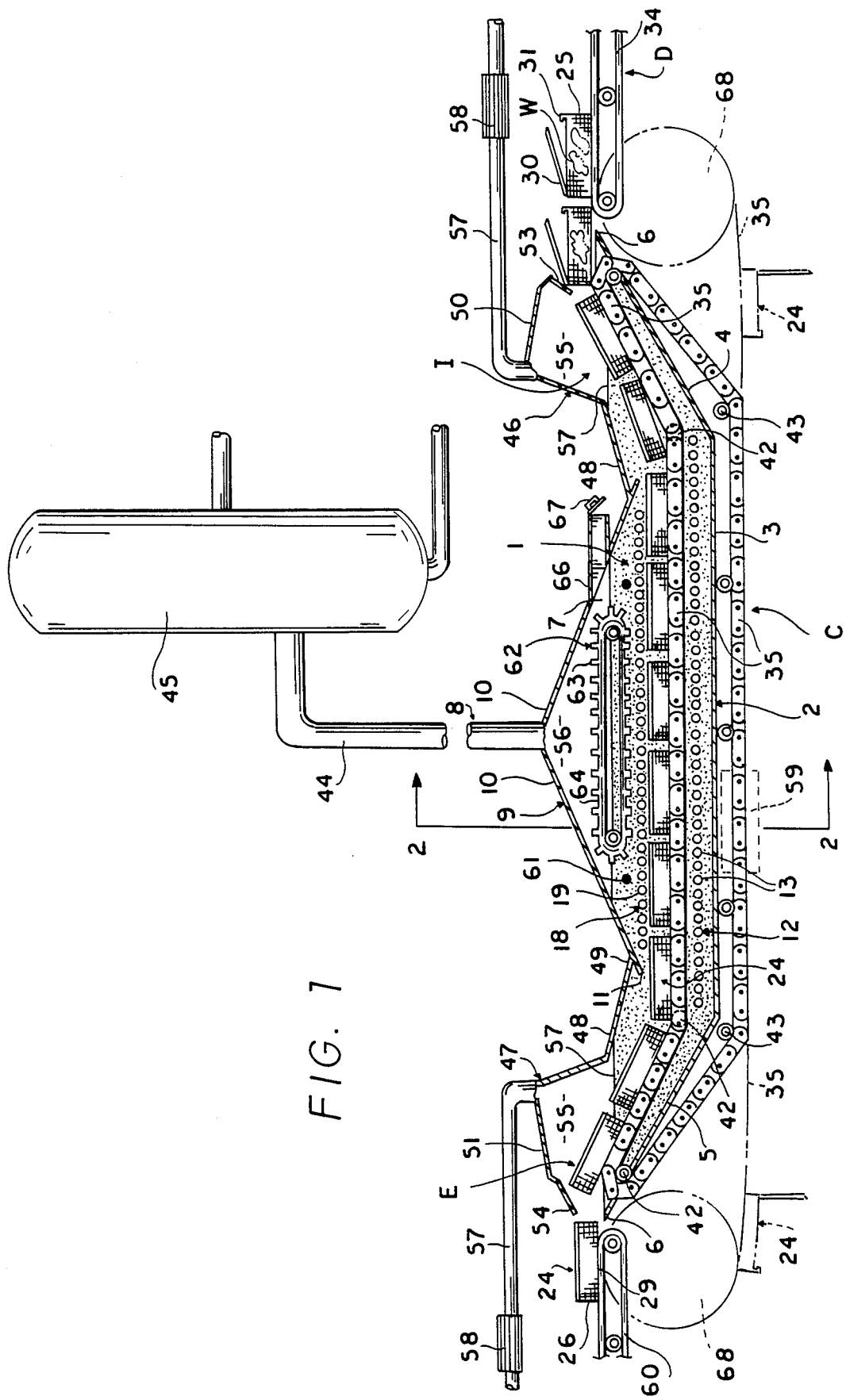
FIG. 1 is a side elevation diagrammatically illustrating the principal components of the invention with alternate container conveying means shown in broken lines.

Referring now to the drawings, particularly FIG. 1, the present invention will be understood to comprise a method and apparatus for continuously delivering, in a sequential manner, batch amounts of organic waste material W to a conversion assembly C. The waste matter W may comprise any available organic material such as tires, wood and paper products, plastics, etc. which, when subjected to heat between 650-900 degrees F., volatilizes or breaks down into its hydrocarbon components in the form of vapors and gasses. To accomplish this reaction, the waste material W is progressively advanced through a heated fluid medium 1 within the tank 2 of the conversion assembly C. To achieve the above temperature parameter, a metallic fluid is utilized, preferably lead. By the present construction, problems encountered in the operation of prior systems for thermally converting organic matter with a lead medium, are sought to be overcome.

The body of lead 1 is contained within the tank 2 having a horizontal bottom wall 3 communicating with opposite, inclined end walls, namely a feed end wall 4 and discharge end wall 5, each terminating in a distal edge 6. Sufficient metal 1 is loaded into the tank 2 so that when heated and melted, its top surface 7 or 57 is disposed just below the tank end wall distal edges 6,6 as shown in FIG. 1.

Mounted above the tank is a hydrocarbon collection assembly, generally designated 8 and which will be seen to include a bottom-most hood 9 having sloping walls 10,10 each with a lower edge 11 positioned substantially below the elevation of the bath top surface 7. To maintain the fluid medium 1 at the required operating temperature, a lower heating array 12 comprising a plurality of heat tubes 13 are disposed immediately above the tank bottom wall 3. As shown most clearly in FIG. 2, each tube 13 includes a plurality of radial fins 14 to assist in the transfer of heat as delivered to each tube by suitable means such as the illustrated burners 15 directed at one open tube end. The burners 15 may be fired with any well known fuel including gas or oil and are mounted within an appropriate vertical duct 16 to carry away flue gasses to a discharge conduit 17.

Lead, which is the preferred heat conveying medium, is an excellent conductor of heat and in its molten state, provides the very temperatures which will effectively convert solid organic material to its hydrocarbon components. However, other properties of lead have made earlier attempts at using lead in related processes, fail to yield a feasible operation. Experiments have shown that heat applied to a lead bath is conducted horizontally at an extremely low rate. This, coupled with the noticeable extraction of latent heat as organic waste products are converted within the bath, normally has resulted in a very inefficient process. Prior attempts to alleviate the situation have included operating the feed rate at a substantially slower rate to allow the molten bath to be reheated or, increasing the BTU rate of the heating means, both of which reduce the effectiveness and increase the cost of the operation.

Figure 2:
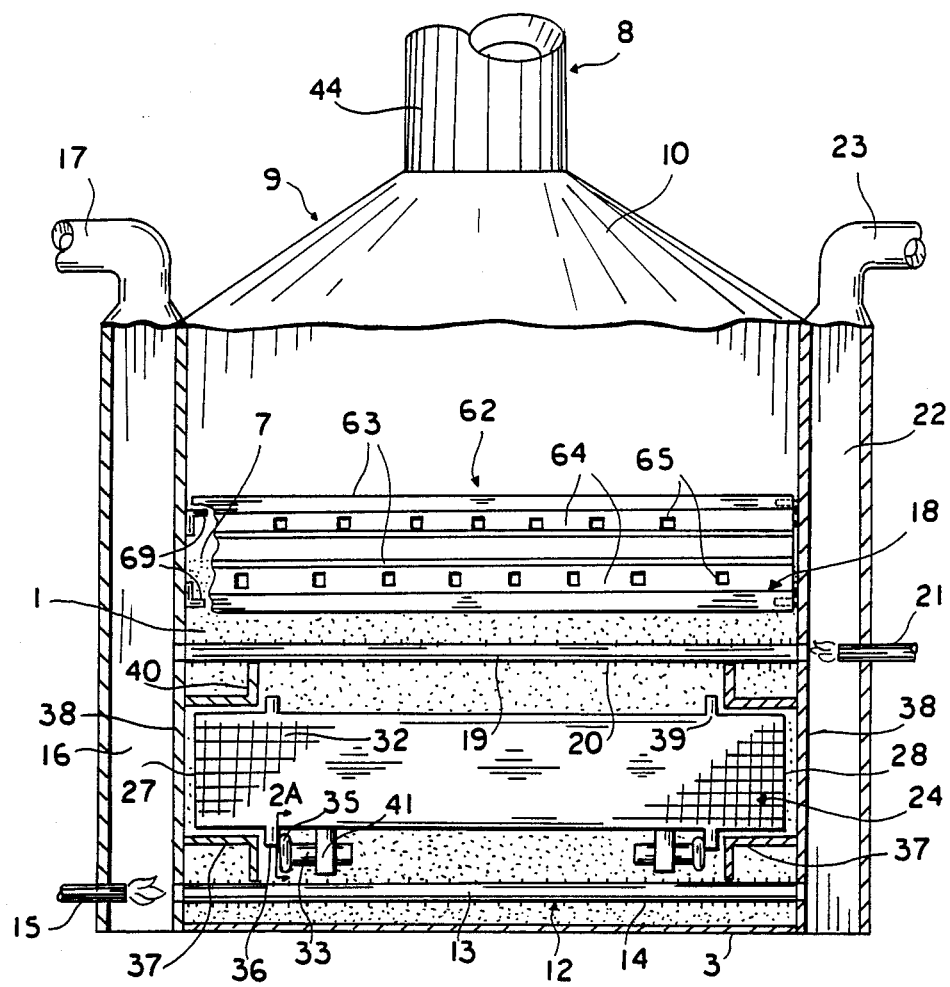
FIG. 2 is vertical transverse sectional view, taken along the line 2—2 of FIG. 1.
Figure 2A:
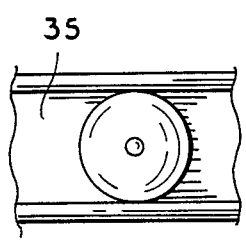
FIG. 2A is a fragmentary side elevation, taken along the line 2A—2A of FIG. 2.

With the instant process, means are provided to effectively maintain the critical area of the molten metal 1 at a temperature no less than 650 degrees F. during the transport of continuously moving batches of organic waste W. A second or upper horizontal heating array 18 will be seen to be disposed above the lower heating array 12, intermediate the tank bottom wall 3 and surface 7 of the molten bath 1. This latter array 18 may comprise tubes 19 with fins 20 and end fed burners 21 similar to those same components as employed in the lower array 12. FIG. 2 illustrates the burners 21 feeding the tubes 19 from the reverse side of the apparatus and contained within a separate flue gas duct 22 leading to a discharge conduit 23. As a variation, alternate ones of each of the heating tubes 13,19 may be fired from opposite ends of the respective tubes, in an effort to more evenly balance the application of heat to the surrounding molten metal 1. As shown in FIG. 1, the upper heating array 18 will be seen to be disposed fully within the confines of the collection assembly hood 9, at an elevation adjacent the hood lower edges 11,11 and well below the bath surface 7.

The conversion process is carried out by sequentially advancing successive batches of waste material W through the lower reaches of the bath 1. This is preferably accomplished by initially loading the organic products into a plurality of individual containers or baskets 24 ahead of the inlet end I of the apparatus. Each container 24 will be understood to comprise an open framework type of receptacle, preferably of rectangular cubic configuration and having opposite end walls 25,26, side walls 27,28 and a bottom wall 29, all forming a substantially rigid structure. A manipulable cover or top wall 30 will be seen to be hingedly attached to the leading end wall 26 and may alternatively cooperate with suitable catch means 31 adjacent the trailing end wall 25 to positively retain the cover in the lowered, closed position. The open type construction of the containers 24 is necessary to insure the substantially unimpeded upward flow of hydrocarbon components and certain residual products as the waste material W is converted by the elevated temperature of the molten bath 1 that has entered and filled the containers. Accordingly, it will be appreciated that the container walls and cover are preferably constructed of mesh material, of any suitable composition, such as stainless steel. A representative construction is shown at 32 in FIG. 2.

FIG. 1 illustrates two methods of supplying the apparatus with the feed material. In the version of the structure as shown in full lines, the organic products W are placed within the individual containers 24 in the area of a delivery assembly D which includes a conveyor 34, operable to continuously advance the filled containers 24 to the inlet end I of the tank 2. At this point, continued actuation of the conveyor 34 shifts the containers 24 to endless conveyor members 35 which will be seen to traverse the entire length of the tank, to the opposite distal edge 6. From FIG. 2 it will be apparent that a pair of these conveyor members 35,35 are laterally spaced apart within the tank such that, as the containers are transferred onto the tank conveyors 35,35, they will be supported in a stable manner during the transport through the bath 1.

To enhance the above referenced stability and to insure that the containers remain axially aligned, properly spaced apart and not become askew during their transport, suitable guidance means are preferably carried by either or both the container cover 30 and bottom wall 29. As shown in FIG. 2, depending flanges 36 on the bottom walls 29 are spaced so as to closely slide between the respective conveyor chains 35 and fixed lower guide rails 37,37 projecting inwardly from the tank side walls 38,38. If included upon the container covers 30, such flanges 39,39 are spaced to closely pass between upper guide rails 40,40. In either instance, means are provided to maintain the axial alignment of the transported containers 24.

Although the various containers 24 are shown in an axially equi-spaced apart disposition in FIG. 1, this spacing is not absolutely necessary as the constantly heated fluid bath 1 is free to pass upwardly through the numerous openings in the mesh construction 32 thereof. Nevertheless, positive means may be included to maintain any desired spacing between adjacent containers 24 and/or to assist in propelling them forward through the bath 1, as will be described shortly hereinafter.

As previously mentioned, a critical item necessary to insure effective operation of the present invention is the maintenance of the required elevated temperature (over 650 degrees F.) throughout that portion of the bath beneath the hood 9. The disposition of the two heating arrays 12 and 18 assist in providing the required heating effect. Thereafter, the very transverse movement of the apertured containers 24 with their contents, assists in stirring or mixing the molten bath 1 as it will be appreciated that the wires forming the container mesh will produce some turbulence leading to a mixing action. To aid in this mixing action, a plurality of inclined or angled vanes 33 may be carried by the conveyor chains 35. In this manner, regardless of the mass or frontal area of the loaded waste products, a definite stirring action will be achieved as the conveyor members 35 are operated. With this in mind, the above mentioned axial spacing means for the plurality of containers 24 may include abutment members 41 projecting from the container bottom walls 29 and adapted to engage or hook about and be driven by the conveyor chain vanes 33 as shown in FIG. 2.

The conveyor members 35,35 are guided and supported within the tank 2 by suitable rollers or guides 42 projecting inwardly from the tank side walls 38 to insure the disposition as viewed in FIG. 1. Likewise, additional roller guides 43 are positioned exteriorly of the tank to allow for the return of the conveyor travel, from the tank exit end E back to the inlet end I.

With the alternative embodiment as reflected by the broken lines in FIG. 1, the entrance and exit conveyor mechanisms 34 and 60 respectively, may be eliminated in favor of the enlarged idler wheels or pulleys 68,68 adjacent the two tank edges 6,6 and about which the conveyor members 35 are sheaved. With this modification, the containers 24 will remain affixed to the conveyor members 35, such as by the retention elements 41, both while the conversion process is occurring within the tank 2 as well as during the transport of the empty containers from the exit end to the entrance end of the tank. The larger diameter of the idlers 68 facilitates the turning around of the containers at the two ends of the conveyor members 35 and provides a greater time span for servicing the containers at either end. This servicing will include insuring that no inorganic material remains in the containers exiting from the tank as well as the filling of empty containers prior to reentry into the tank.

As the waste-filled containers 24 proceed through the conversion assembly C and the heat of the bath breaks down the organic materials to hydrocarbon vapors and gasses, these hydrocarbon products rise in the bath and are captured within the collector assembly hood 9 from whence they are conveyed through the collector conduit 44 to any desired hydrocarbon processing apparatus, such as the illustrated fractionator 45. Experiments have shown that as much as one gallon of usable hydrocarbon fuel is collected from the conversion of but one vehicle tire.

The speed of the conveying mechanisms will obviously be calculated in accordance with the nature of the waste material W being converted, so as to insure the maximum conversion thereof by the time each container 24 reaches the end of the horizontal run within the tank 1.

To collect any vapors or gasses which may be emitted from the bath 1 before and after the containers are disposed beneath the confines of the collector hood 9, entrance and exit shroud assemblies 46,47 are mounted above the distal edges 6,6 of the tank 2. These shrouds include inner, inclined walls 48 limiting the elevation of the bath surface 7 and terminating in lower edges 49 engaging the hood 9 above its lower edge 11. A shroud outer wall 50 or 51 extends away from the respective ends of the tank 2 and supports a hanging, yieldable door 53 or 54. The function of the two doors 53,54 will be apparent from FIG. 1 wherein it will be seen that gravity keeps the doors in the lowestmost position to minimize the escape of vapors from the collection cavity 55 of each shroud assembly. With this construction, the inner walls 48 isolate the main hydrocarbon collection cavity 56 within the hood 9, from the separate, endmost bath top surfaces 57,57 to further minimize hydrocarbon discharge outside the confines of the hood 9. The resultant significant distance between the central bath top surface 7 and each of the outer top surfaces 57 assists in maintenance of the necessary oxygen-free environment within the confines of the hood 9.

Any light hydrocarbon and steam emissions collected within the shroud assembly cavities 55 are carried away via offtake conduits 57 for suitable treatment. To enhance the prevention of escape of emissions through the open doors 53,54, a slight negative pressure is created within the cavities 55 by means of a fan mechanism 58 in the conduits 57.

Summarizing the operation of the instant system as above described, organic waste W arrives at the conversion assembly C, deposited in the containers 24. Either the conveyor mechanism 34 of the delivery assembly D or the righthand idler 68 sequentially advances the containers through the entrance door 53 whereafter the bottoms 29 thereof are engaged by the endless conveyor members 35,35. The upper rails 40,40 engage the top wall or cover 30 of the containers 24 as they are directed beneath the isolated, bath surface 57.

Actuation of suitable drive means 59 controls the advancement of the containers through the tank 2 in accordance with the volume and nature of the waste material W. For example, if the waste comprises primarily paper products, then the conversion to hydrocarbon components will occur quite rapidly as the material is subjected to temperatures between 650-900 degrees F. Thus, a relatively high speed of travel may be employed through the horizontal, bottom run of the conveyor members 35,35, with a corresponding speed for the conveyors 34 and 60 of the delivery and exit assemblies, when employed. However, in the case of tires for example, longer exposure will be required to complete the conversion and accordingly, the drive means 59 will operate at a slower speed.

Any well known regulating means (not shown) may be utilized to control the drive means 59 and may include temperature sensors 61 within the bath 1 whereby, as certain waste materials consume greater amounts of heat from the molten bath and thus reduce its temperature, the sensor readings cause the drive control 59 to operate the conveyors at a slower speed thereby permitting the heating arrays 3 and 18 to return the bath 1 to its prescribed temperature.

During the travel through the horizontal phase within the tank 2, since all waste organic materials will exhibit a specific gravity substantially less than that of the lead bath 1, the waste products as well as the containers 24 will tend to rise within the bath. The rising waste material W is captively retained within the containers and adds to the buoyancy of the containers which are retained in the submerged plane atop the conveyor members 35,35 by means of the laterally disposed rails 40,40 overlying the container top walls 30. As previously described, the containers are constructed of an open mesh material 32 and which prevents the passage of waste material not yet acted upon by the heat of the bath 1. Small organic particles passing through the mesh 32, rise upwardly and are subjected to the elevated temperature as produced by the upper heating array 18 and become converted to hydrocarbon gas or vapor before reaching the bath surface 7, from whence they are directed to the desired secondary apparatus, such as the fractionator 45.

Non-organic material included in the waste W, if too large to pass through the apertures of the container mesh 32, such as steel belts from tires, is simply removed after the containers have been collected by the exit conveyor 60 or are engaged by the lefthand idler 68. When employing the entrance and exit conveyors 34 and 60, quite obviously both conveyors may progress around the apparatus and be continuous, thus making the entire operation of the invention truly a continuous system. Smaller particles of inorganic material, as well as other by-products such as carbon black and ash, will accumulate upon the top surface 7 of the bath 1 and must be periodically removed. To accomplish this, a skimmer assembly 62 is provided at the surface level within the hood 9 and may comprise an endless conveyor type of apparatus including a plurality of transverse flights or skimmer elements 63 spanning the majority of the extent of the bath surface within the hood. The belt or support 64 for the skimmer elements 63 is apertured or slotted, preferably in a staggered manner, as at 65 in FIG. 2 in order to allow for the vertical migration of gasses and vapors from the bath therebeneath. To prevent sagging of the top run of the belt 64 and to resist the buoyancy effect of the bottom run, brackets or rails 69 attached to the tank side walls 38,38, engage the inner surfaces of each skimmer belt run.

To allow for the disposition of the above mentioned waste products accumulating upon the bath surface 7, and as collected upon operation of the skimmer assembly 62, a cleanout or removal chamber 66 is fitted through the hood 9, at an elevation no lower than the bath surface 7. In this manner, upon opening of the chamber door 67, residual solid products rising to the surface 7 and collected by the skimmer 62, are readily raked or otherwise removed through the chamber 66.

During such operation, the strong updraft created by the rising vapors within the conduit 44 produces a negative pressure discouraging the escape of vapors from the opened cleanout door 67.

Figure 3:
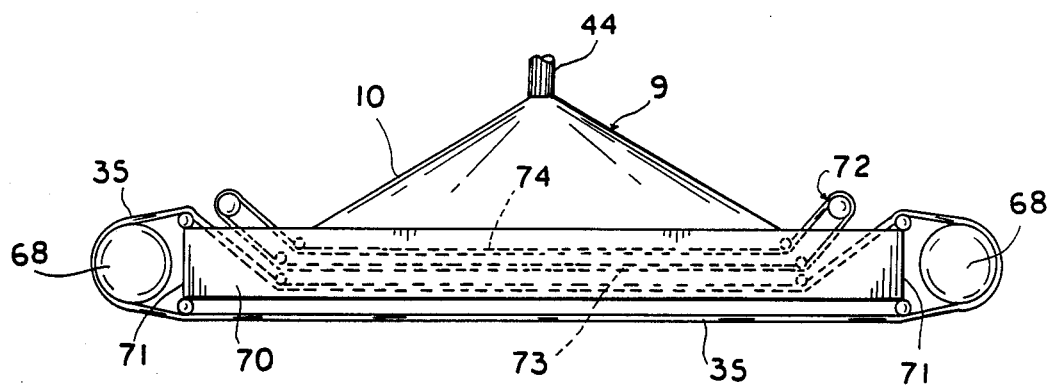
FIG. 3 is a side elevation diagrammatically illustrating a second conveyor system operating atop the primary conveyor members.

The thermal conversion process as represented in the embodiment depicted in FIG. 3 of the drawings will be understood to employ the same principal as described hereinabove. That is, a tank 70, having either inclined or vertical end walls 71 is adapted to contain a body of molten metal, such as lead and which is heated at previously described. In this version, the waste organic material is similarly advanced through the bath by the lowermost, primary conveyor members 35 but flotation of the containers (not shown) is prevented by means of secondary, uppermost conveyors 72 having horizontal bottom runs 73 parallel to and spaced above the immersed run of the primary conveyor members 35. The top run 74 of these secondary conveyor members 72 are preferably likewise immersed within the bath but alternatively may span the bottom run exteriorly of the apparatus (not shown).

It is to be understood that the present invention is not limited to the sole embodiment described above, but encompasses any and all embodiments within the scope of the following claims.

We claim:

1. An apparatus for thermal conversion of organic matter comprising;
   a tank having a substantially flat bottom wall joined to opposite end walls terminating in distal entrance and exit edges respectively,
   molten metal within said tank having a top surface disposed in a plane adjacent said distal edges, said molten metal capable of being heated to a temperature above 650 degrees F.,
   a first heating array comprising a plurality of adjacent heating tubes within said tank adjacent said bottom wall and operable to maintain said molten metal at a temperature above 650 degrees F.,
   conveying means within said tank atop said first heating array,
   delivery means adjacent said entrance tank edge and exit means adjacent said exit tank edge,
   a plurality of individual apertured containers for housing organic waste material, said delivery means operable to move said containers to said entrance tank edge for subsequent movement with said conveying means and transport through said heated molten metal in said tank,
   means on said containers maintaining axial alignment of said containers during transport through said tank,
   means within said tank preventing vertical displacement of said containers due to buoyancy during transport through said tank,
   a second heating array within said tank comprising a plurality of heating tubes disposed in a substantially horizontal plane vertically spaced above said first heating array,
   a hood for collecting hydrocarbon gasses and vapors overlying said tank bottom wall and having opposite lower edges disposed below the level of said top entrance and exit tank edges, and
   means within said tank displaceable during said transport of said containers through said tank to agitate said molten metal to maximize the even distribution of heat within said molten metal and to encourage the maximum conversion of waste material to hydrocarbon components.

2. An apparatus for thermal conversion of organic matter according to claim 1 wherein:
   said end walls on said tank are inclined outwardly from said tank bottom wall with portions of said molten metal disposed atop said end walls and presenting secondary top surfaces whereby,
   said molten metal top surface beneath said hood is isolated from said secondary top surfaces above said inclined end walls.

3. An apparatus for thermal conversion of organic matter according to claim 2 including,
   shroud assemblies providing collection cavities overlying said molten metal top secondary surfaces.

4. An apparatus for thermal conversion of organic matter according to claim 1 wherein,
   said axial alignment maintaining means includes elements projecting from said containers, and
   guide means within said tank engageable with said projecting elements.

5. An apparatus for thermal conversion of organic matter according to claim 1 wherein,
   each of said containers includes a plurality of walls bounded by a closable cover.

6. An apparatus for thermal conversion of organic matter according to claim 1 wherein,
   each of said containers includes a plurality of walls constructed of metal mesh.

7. An apparatus for thermal conversion of organic matter according to claim 1 wherein,
   said vertical displacement preventing means includes elongated elements fixed within said tank and overlying said containers during transport through said tank.

8. An apparatus for thermal conversion of organic matter according to claim 1 including,
   a fractionator receiving gasses and vapors collected by said hood.

9. An apparatus for thermal conversion of organic matter according to claim 1 wherein,
   said molten metal agitating means includes a plurality of deflector members on said conveying means movable through said tank above said first heating array.

10. An apparatus for thermal conversion of organic matter according to claim 1 including,
    skimmer means within said tank disposed adjacent said molten metal top surface within said hood.

11. An apparatus for thermal conversion of organic matter according to claim 10 including,
    a cleanout chamber disposed through said hood at a level adjacent said molten metal top surface.

12. An apparatus for thermal conversion of organic matter according to claim 1 wherein,
    said delivery and exit means include an idler pulley disposed exteriorly of said tank, and
    said conveying means includes endless conveyor members having bottom runs disposed exteriorly of said tank.

13. An apparatus for thermal conversion of organic matter according to claim 1 wherein,
    said vertical displacement preventing means includes secondary endless conveyor members vertically disposed atop said conveying means within said tank.

* * * * *